J. S. Sammons.

Slate Roofing.

N° 557.
31,561.
Patented Feb. 26, 1861.

Witnesses.
C. W. Cowtan
M. Thompson

Inventor.
J. S. Sammons

THE GRAPHIC CO.PHOTO-LITH.39 & 41 PARK PLACE,N.Y.

UNITED STATES PATENT OFFICE.

J. S. SAMMONS, OF NEW YORK, N. Y.

ROOFING WITH SLATE.

Specification of Letters Patent No. 31,561, dated February 26, 1861.

*To all whom it may concern:*

Be it known that I, J. S. SAMMONS, of the city, county, and State of New York, have invented a new and useful Improvement in Roofing with Slate; and I do hereby declare that the following is a full, clear, and exact description of the same, reference being had to the accompanying drawings, making part of this specification, in which—

Figure 1:
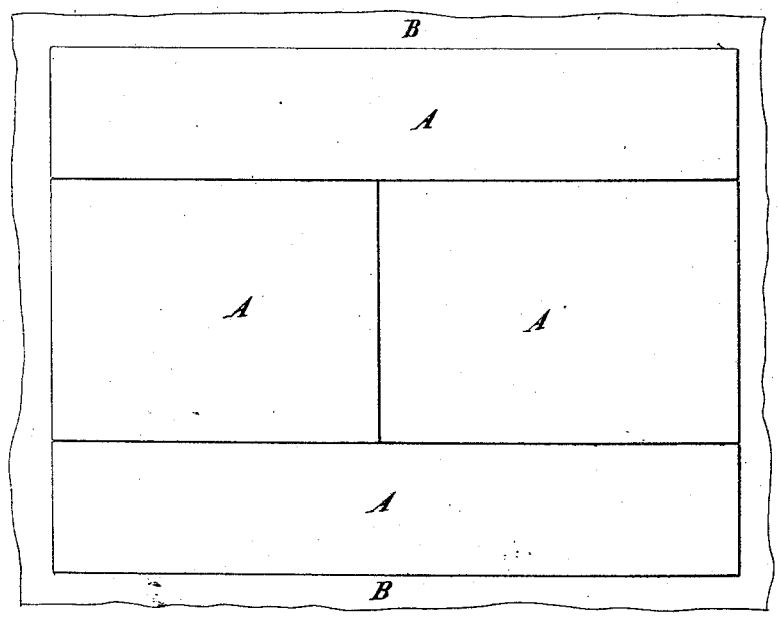
Figure 2:

Figure 1 is a top view of the improved manner of laying slate roof. Fig. 2 is a section showing the manner of securing the slates.

Similar letters of reference indicate corresponding parts in both figures.

To enable those skilled in the art to fully understand my invention I will proceed to describe it.

The slabs of slates are trimmed in the usual manner and their opposite edges are made parallel to each other, they should be cut of a uniform width but they need not all be of one exact length. When the slate is cut and trimmed in a proper manner all their edges are ground down upon a flat surface to a miter or bevel, as shown at *a*, *a*, Fig. 2.

In laying the slates, instead of overlapping their edges in the usual manner they are laid flat on the battens, with one edge abutting that of the next slate and if desirable the joints of one course may break joints with the next course. Before each slate is laid down however its edges are covered with a suitable holding cement which will fill up the trilateral space (formed by the two beveled edges abutting) at the joints or seams and not only secure the edges of the slate together but the cement will attach itself to the battens and hold the slates down firmly thereto making an unexposed waterproof seam and a smooth surfaced roof.

A, A, are the slabs of slates.

B, is the planking or battens, and *a*, *a*, show the bevel edges of the slate forming a space when brought together which is filled up with the cement *b*. The latter is composed of pitch, rubber and the earthy substance known as mineral paint. I have stated that the slates must be prepared or provided with cement before they are put upon the roof. This is done by heating the cement until it is brought to a liquid state and then applying the edges of the slates to it. By cooling, the cement becomes hard and firmly attached to the slate edges.

In order to make the edges of the slates adhere to the roof, and to each other when they are laid down, the edges are held in contact with a heated iron, so as slightly to melt the cement. The slates are then pressed together in the manner hereinbefore described, when the melted cement unites with the cement upon the edges of the previously laid slates, and the edges of the slates with the cement contained in the interstices become firmly united together, forming a strong, water proof, and durable joint. The melted cement also attaches itself to the wood of the roofing upon which the slates are laid, and thus the edges of the slates are firmly cemented to the roofing.

I do not claim broadly the laying of slates in cement for I am aware that flooring plates of marble and other substances have been so laid; nor do I claim broadly the filling of seams with bituminous matter in a hot state, by pouring the same into the seams. Such method could not be successfully used upon inclined roofs because the substance would tend to run downward and would adhere exclusively to but one edge of the slates, but,

Having thus described my invention what I claim as new and desire to secure by Letters Patent is:

The within described mode of attaching slates to roofs which consists in preparing the edges of the slates with cement, then applying said edges to a hot iron or other heater to melt the cement; then pressing the edges of the slates against each other and against the roofing, all as herein set forth and described so that the slates will be firmly attached to each other and to the roofing by the cement, without the necessity of any other fastening.

J. S. SAMMONS.

Witnesses:
C. W. COWTAN,
M. M. LIVINGSTON.